G. F. MORSE.
Locomotive Foot Board.
No. 102,299.
Patented April 26, 1870.
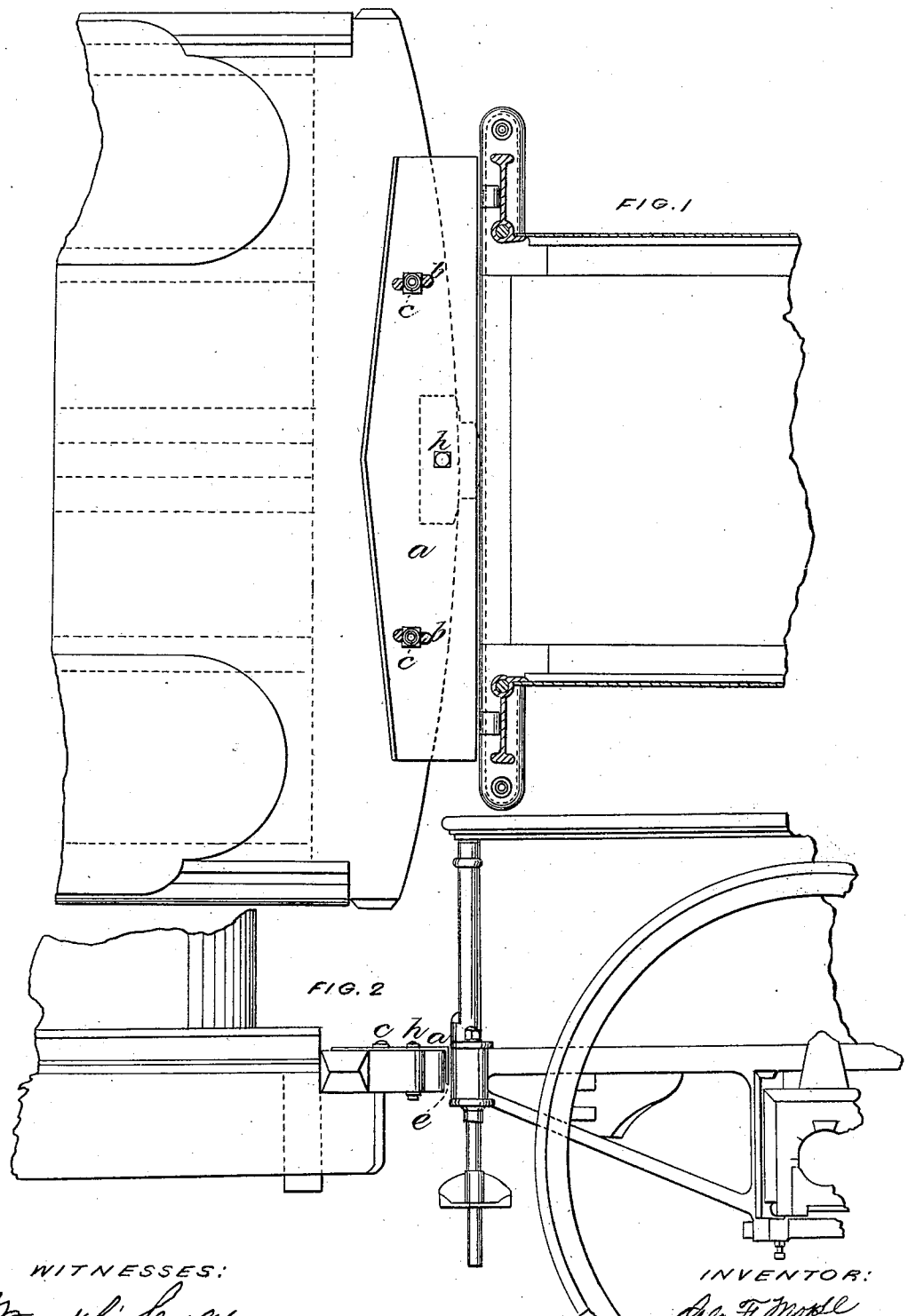

United States Patent Office.

GEORGE F. MORSE, OF PORTLAND, MAINE.

Letters Patent No. 102,299, dated April 26, 1870.

IMPROVEMENT IN FOOT-BOARD FOR LOCOMOTIVES.

The Schedule referred to in these Letters Patent and making part of the same.

*To all whom it may concern:*

Be it known that I, GEORGE F. MORSE, of Portland, in the county of Cumberland and State of Maine, have invented a new and useful Swiveling Foot-Board for [Locomotives; and I hereby declare the following to be a full, clear, and exact description thereof, which will enable others to make and use my invention, reference being had to the accompanying drawings forming part of this specification, in which—

Figure 1 is a top view of the foot-board of engine and tender, with my improvement thereon.

Figure 2 is a side view of the same.

There is necessarily left, between the locomotive and tender commonly in use upon railroads, a small space to allow of the different positions taken by the engine and tender when passing over curves in the line of track, the two, as is well known, being united by the ordinary couplings underneath the fixed foot-boards. Without this space the outer ends of the fixed foot-boards would be brought into contact with each other while passing around such curves.

This space between the engine and tender is objectionable for several reasons, one of which is that it is liable to occasion accident to the drivers or attendants on the engine, and another is that it permits dust to rise through it as the train moves, and collect upon the engine and tender. And, moreover, in the winter season, especially in cold climates, it allows ice, frozen snow, &c., to collect on the edges of the fixed foot-boards of both engine and tender, and thus endanger persons stepping thereon, beside being inconvenient by reason of the accumulation thereof upon the foot-boards.

Still another objection to this open space is the fact that tools, &c., falling from the engine or tender, are liable to either fall directly, or be shaken by the jolting of the train, down through the space between the locomotive and tender, and thus be lost.

My device is designed to obviate all these objections, and is as follows:

A swiveling foot-board, to be firmly attached to the fixed foot-board of either the locomotive or tender, by means of a pivot or bolt in the center of the swiveling foot-board, passing through the fixed foot-board to which the swiveling one is attached. The connection is preferably made to the fixed foot-board of the tender. The swiveling foot-board is made with a flange projecting downward, for the purpose of more complete exclusion of snow, dust, &c.

In this swiveling foot-board I construct curved slots, through which slots, and entering into the fixed foot-board, extend bolts, for the purpose of guiding the foot-board in its movements.

Now, as the locomotive and tender pass a curve, and assume such positions relative to each other as the curve causes, the forward edge of the swiveling foot-board bearing closely against the rear edge of the fixed foot-board of the locomotive, and taking its motion from the same, the bolts, curved slots, and central pivot combine to allow it to move freely, following the motion and position of the engine, while, at the same time, the space between the locomotive and tender foot-boards is covered, and the driver can pass freely over the same.

In the accompanying drawings—

$a$ shows the supplemental or swiveling foot-board.

$b\ b$, the curved slots.

$c\ c$, the bolts therein.

$e$, in fig. 2, shows the downwardly-extending flange.

$h$, the central bolt or pivot.

The dotted lines in fig. 1 show the forward edge of the fixed foot-board of the tender.

Especially in the winter season it is absolutely necessary that this space should be closed, and this has heretofore been done by means of a hinged flap attached to either the engine or tender, or by means of a strip of leather or canvass stretched between the two.

My swivelling foot-board has the advantage of being perfectly noiseless, which is not the case with the hinged one, which is constantly rising and falling with the motion of the train, and the different movements of the engine and tender.

I do not claim a platform bridge for cars in which the platform of one car, being of one sheet of metal, is inserted between two sheets of metal having a slight space between them, which two sheets form the other platform. Mine is different in construction from this, in that it exhibits the additional board or sheet of metal having the curvilinear slots and the studs.

The rejected case of John Hood, which is the one above referred to, could not well or conveniently be applied between the tender and the engine. Mine contemplates being used where the two carriages are never separated, as is the case with the engine and tender, and not between cars, which are often disunited.

What I claim as my invention, and desire to secure by Letters Patent, is—

The combination of the board $a$, the curved slots $b$, the studs $c$, and the bolt $h$, as herein described.

GEO. F. MORSE.

Witnesses:
WM. HENRY CLIFFORD,
HENRY C. HOUSTON.